United States Patent Office 2,950,331
Patented Aug. 23, 1960

2,950,331

3-BROMO-1-CHLORO-1-PROPYNE

William E. Duggins, Berkley Heights, N.J., assignor to General Aniline & Film Corporation, New York, N.Y., a corporation of Delaware No Drawing. Filed Jan. 31, 1958, Ser. No. 712,293

1 Claim. (Cl. 260—654)

The present invention relates to 3-bromo-1-chloro-1-propyne and to a process for preparing the same.

The preparation of 1-bromo-3-chloro-1-propyne, an isomer of 3-bromo-1-chloro-1-propyne, by treatment of propargyl chloride with a cold alkaline solution containing hypobromite ion was reported by Hatch and Kidwell, J. Am. Chem. Soc., v. 76, pp. 289–90, 1954. Hatch and Kidwell report that attempts to react hypochlorite ion with propargyl chloride and with propargyl bromide were unsuccessful.

It is an object of the present invention to provide a method for preparing 3-bromo-1-chloro-1-propyne which is particularly useful as a soil fumigant for the control and eradication of soil nematodes.

I have found that 3-bromo-1-chloro-1-propyne is readily prepared by reacting one mole of propargyl bromide with an aqueous solution containing one to three moles of sodium hypochlorite. The use of one mole of sodium hypochlorite gives the desired product. However, when larger amounts ranging from one to three moles of sodium hypochlorite are used, the yield is somewhat higher. An aqueous solution of sodium hypochlorite is commonly prepared by passing chlorine into an aqueous solution of sodium hydroxide. The reaction mixture is stirred at 5° C. to room temperature for a period of two to six hours. If desired, the product can be separated from the reaction mixture by extraction with a suitable solvent such as diethyl ether. In this case the 3-bromo-1-chloro-1-propyne is isolated by distilling the solvent. The product can, of course, be further purified by the usual techniques such as distillation.

The following example will clearly illustrate in greater detail the exact procedural steps that are employed in preparing the 3-bromo-1-chloro-1-propyne.

*Example*

A 2-liter flask fitted with an agitator and thermometer was charged with 733 grams of an aqueous solution containing 37.5 grams (0.504 mole) of sodium hypochlorite. This solution was cooled to 5 to 10° C. and 30 grams (0.252 mole) of propargyl bromide slowly added and the mixture stirred for four hours. The reaction mixture was extracted with ether. After separation of the ethereal layer, the solvent was removed by evaporation. The resulting 3-bromo-1-chloro-1-propyne was not spontaneously flammable in air.

*Analysis.*—Calc.: Cl, 23.11; Br, 52.09. Found: Cl, 21.35, Br, 53.60.

I claim:
3-bromo-1-chloro-1-propyne.

References Cited in the file of this patent

UNITED STATES PATENTS 2,749,377    Johnston _____ June 5, 1956

OTHER REFERENCES

Hatch et al.: Jour. Am. Chem. Soc., vol. 76, pages 289 and 290, 1954.